United States Patent
Kim et al.

(10) Patent No.: US 9,584,057 B2
(45) Date of Patent: Feb. 28, 2017

(54) CONTROL DEVICE AND METHOD FOR IMPROVING VOLTAGE UTILIZATION RATIO OF INVERTER FOR GREEN CAR

(71) Applicants: Hyundai Motor Company, Seoul (KR); Kia Motors Corporation, Seoul (KR)

(72) Inventors: Sung Kyu Kim, Gyeonggi-Do (KR); Mu Shin Kwak, Gyeonggi-Do (KR); Hong Geuk Park, Chungcheongnam-Do (KR); Su Hyun Bae, Daegu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 123 days.

(21) Appl. No.: 14/569,655

(22) Filed: Dec. 13, 2014

(65) Prior Publication Data

US 2016/0006385 A1    Jan. 7, 2016

(30) Foreign Application Priority Data

Jul. 2, 2014 (KR) .................. 10-2014-0082357

(51) Int. Cl.
*H02P 21/00* (2016.01)
*H02P 6/00* (2016.01)
(Continued)

(52) U.S. Cl.
CPC .......... *H02P 21/0035* (2013.01); *B60L 15/00* (2013.01); *H02P 6/14* (2013.01);
(Continued)

(58) Field of Classification Search
CPC ........ H02P 21/06; H02P 21/141; H02P 21/26; H02P 21/00; H02P 21/0089; H02P 21/13;
(Continued)

(56) References Cited

U.S. PATENT DOCUMENTS 4,808,903 A * 2/1989 Matsui .................... H02P 21/22
318/800
5,565,752 A * 10/1996 Jansen ................. H02K 17/165
310/169

(Continued)

FOREIGN PATENT DOCUMENTS

JP         2013-005618 A    1/2013
KR   10-2006-0062466 A    6/2006

(Continued)

OTHER PUBLICATIONS

Kwon, Y.C. et al., "Improved Speed Control of Permanent Magnet Synchronous Machine at Overmodulation Region", IEEE (2012) pp. 938-945.

(Continued)

*Primary Examiner* — Paul Ip
(74) *Attorney, Agent, or Firm* — Mintz Levin Cohn Ferris Glovsky and Popeo, P.C.; Peter F. Corless

(57) ABSTRACT

A control device and a control method can improve a voltage utilization ratio of an inverter for a green car, in which an input DC voltage of the inverter is modulated by a maximum amount into an output AC voltage of the inverter by changing the output AC voltage incapable of being linearly output into a voltage capable of being linearly output. The control method includes steps of: generating a two-phase current command having two phases of a first current command and a second current command; generating a two-phase voltage command having two phases of a first voltage command and a second voltage command; generating a three-phase pole voltage command; modulating the three-phase pole voltage command into a linear output voltage capable of being linearly output; and calculating a voltage gain value, using the two-phase voltage command and an input DC voltage of the inverter.

10 Claims, 4 Drawing Sheets

(51) Int. Cl.
*H02P 6/14* (2016.01)
*B60L 15/00* (2006.01)
*H02P 27/08* (2006.01)

(52) U.S. Cl.
CPC ............... *H02P 21/22* (2016.02); *H02P 27/08* (2013.01); *Y02T 10/644* (2013.01); *Y02T 10/7241* (2013.01); *Y02T 10/7258* (2013.01)

(58) Field of Classification Search
CPC .......... H02P 21/18; H02P 21/22; H02P 21/24; H02P 2207/01; H02P 6/183; H02P 21/0003; H02P 21/0007; H02P 21/08; H02P 21/12
USPC .... 318/400.02, 400.04, 400.27, 400.34, 432, 318/599
See application file for complete search history.

(56) References Cited

U.S. PATENT DOCUMENTS

| | | | | |
|---|---|---|---|---|
| 5,585,709 A * | 12/1996 | Jansen | ................. | H02K 17/165 318/720 |
| 5,610,485 A * | 3/1997 | Depenbrock | ........... | H02P 21/06 318/432 |
| 5,627,742 A * | 5/1997 | Nakata | ....................... | B60L 9/22 323/235 |
| 5,657,216 A * | 8/1997 | Kaura | ................. | H02M 7/5395 363/41 |
| 5,659,473 A * | 8/1997 | Noro | .................... | B62D 5/0463 180/412 |
| 5,736,825 A * | 4/1998 | Kaura | .................... | G05B 11/28 318/599 |
| 5,835,878 A * | 11/1998 | Saito | .................... | B60K 31/047 123/361 |
| 5,936,370 A * | 8/1999 | Fukao | ................ | F16C 32/0448 318/400.27 |
| 6,366,483 B1 * | 4/2002 | Ma | ..................... | H02M 1/4216 363/37 |
| 6,388,419 B1 * | 5/2002 | Chen | ....................... | B60L 11/14 318/727 |
| 6,504,329 B2 | 1/2003 | Stancu | ................. | B60L 15/025 318/400.04 |
| 6,850,033 B1 * | 2/2005 | Gallegos-Lopez | . | H02P 21/0089 318/800 |
| 6,940,251 B1 * | 9/2005 | Sarlioglu | ................ | H02P 21/28 318/400.34 |
| 6,940,253 B2 * | 9/2005 | Hinkkanen | ........... | H02P 21/141 318/803 |
| 6,984,960 B2 * | 1/2006 | Stancu | ................... | H02M 1/12 318/629 |
| 7,145,310 B2 * | 12/2006 | Ihm | ........................ | H02P 21/06 318/700 |
| 7,242,163 B2 * | 7/2007 | Gallegos-Lopez | ..... | H02P 21/06 318/722 |
| 7,629,764 B2 * | 12/2009 | Shoemaker | .......... | G05B 13/042 318/432 |
| 8,362,759 B2 * | 1/2013 | Ha | .................... | H02M 7/53875 318/729 |
| 2005/0001583 A1 * | 1/2005 | Hinkkanen | ........... | H02P 21/141 318/807 |
| 2005/0046370 A1 * | 3/2005 | Gallegos-Lopez | ..... | H02P 21/06 318/434 |
| 2006/0132082 A1 * | 6/2006 | Ihm | ........................ | H02P 21/06 318/717 |
| 2007/0296364 A1 * | 12/2007 | Shoemaker | .......... | G05B 13/042 318/561 |
| 2010/0148753 A1 * | 6/2010 | Ha | .................... | H02M 7/53875 324/107 |
| 2012/0206949 A1 * | 8/2012 | Owen | ..................... | H02P 21/22 363/127 |
| 2013/0221885 A1 * | 8/2013 | Hunter | ................ | H02P 21/0003 318/400.15 |
| 2013/0229135 A1 * | 9/2013 | Long | ...................... | H02P 21/13 318/400.34 |
| 2013/0231891 A1 * | 9/2013 | Long | ...................... | H02P 21/13 702/145 |
| 2014/0210386 A1 * | 7/2014 | Zhao | ....................... | H02P 21/36 318/400.02 |
| 2014/0210387 A1 * | 7/2014 | Zhao | ....................... | H02P 21/24 318/400.02 |
| 2014/0333241 A1 * | 11/2014 | Zhao | ....................... | H02P 21/24 318/400.02 |

FOREIGN PATENT DOCUMENTS

| | | |
|---|---|---|
| KR | 10-2010-0028968 A | 3/2010 |
| KR | 10-2011-0109433 A | 10/2011 |
| KR | 10-1272955 B1 | 6/2013 |

OTHER PUBLICATIONS

Bae, B.H. et al., "A New Overmodulation Strategy for Traction Dirve.", English Abstract, 8 pages.
Kerkman, R.J. et al., "An Overmodulation Strategy for PWM Voltage Inverters", IEEE (1993) pp. 1215-1221.

\* cited by examiner

CONTROL DEVICE AND METHOD FOR IMPROVING VOLTAGE UTILIZATION RATIO OF INVERTER FOR GREEN CAR

CROSS-REFERENCE TO RELATED APPLICATION

This application claims under 35 U.S.C. §119(a) the benefit of Korean Patent Application No. 10-2014-0082357 filed on Jul. 2, 2014, the entire contents of which are incorporated herein by reference.

BACKGROUND (a) Technical Field

The present invention relates to a control device and a control method for improving a voltage utilization ratio of an inverter for a green car, and more particularly, to a control device and a control method for improving a voltage utilization ratio of an inverter for a green car, which can improve the output and efficiency of a motor system and enhance vehicle fuel efficiency by improving the voltage utilization ratio of the inverter for controlling a driving motor of the green car.

(b) Description of the Related Art

As is known in the art, green cars including an electric vehicle (EV), a hybrid electric vehicle (HEV), a fuel cell electric vehicle (FCEV), and the like use electric motors as driving sources for vehicle driving.

In particular, a motor is driven by converting DC power stored in a main battery of a vehicle into three-phase AC power using an inverter, and the driving power of the motor is transmitted to driving wheels, thereby driving the vehicle.

In a motor system including a motor that is a driving source of a green car and an inverter, the inverter is generally configured with a plurality of insulated gate bipolar transistors (IGBTs). The inverter converts a DC voltage supplied from a battery through switching in response to a pulse width modulation (PWM) signal and supplies the converted voltage as a phase voltage for driving the motor.

The inverter acts as a motor controller, and controls operation of the motor by outputting a final PWM signal using a torque command signal applied from a hybrid control unit (HCU), a battery voltage state applied from the battery, and motor speed information applied from the motor.

However, in above-described conventional method, there is a disadvantage in that an input DC voltage Vdc input to the inverter is used in only a linear section, and therefore, any efficiency and output improvements of the motor system are limited.

In particular, when there is generated a voltage (output AC voltage of the inverter) incapable of being linearly output with respect to the input DC voltage of the inverter, the output of the inverter is limited so that only a linear output is generated. Therefore, the efficiency and output of the motor system are limited.

When the input current of the motor is controlled by improving a voltage utilization ratio of the inverter in a situation in which the output of the inverter is controlled using the conventional method, the motor control stability in a partial region is disadvantageous.

SUMMARY

The present invention provides a control device and a control method for improving a voltage utilization ratio of an inverter for a green car, in which an input DC voltage of the inverter is modulated, e.g., by a maximum amount into an output AC voltage of the inverter by changing the output AC voltage incapable of being linearly output into a voltage capable of being linearly output, so that it is possible to improve the efficiency of a motor system as input current decreases under the same output condition and to improve the output of the motor system under the same current condition.

In one aspect, the present invention provides a control device for improving a voltage utilization ratio of an inverter for a green car, the control device including: a current controller configured to generate a two-phase voltage command (Vdqref) having two phases of a first voltage command and a second voltage command; a command conversion unit configured to receive the two-phase voltage command (Vdqref) input from the current controller to generate a three-phase pole voltage command (Vabcn_ref); a first over-modulator configured to modulate the three-phase pole voltage command (Vabcn_ref) input from the command conversion unit into a voltage capable of being linearly output; and a high gain calculator configured to receive the two-phase voltage command (Vdqref) of the current controller and an input DC voltage (VdcLPF) of the inverter to calculate a voltage gain value.

In an exemplary embodiment, the control device may include a multiplicator configured to multiply an output value of the first over-modulator by an output of the high gain calculator; and a second over-modulator configured to receive an output value of the multiplicator to modulate the received output value into a voltage capable of being linearly output.

In another exemplary embodiment, the command conversion unit may include a phase converter configured to receive the two-phase voltage command (Vdqref) input from the current controller to convert the received two-phase voltage command (Vdqref) into a three-phase phase voltage command (Vabcs_ref); and a space vector modulator configured to convert the three-phase phase voltage command (Vabcs_ref) input from the phase converter into a three-phase pole voltage command (Vabcn_ref).

In still another exemplary embodiment, the control device may include a current command map unit configured to generate a two-phase current command (Idq_ref) having two phases of a first current command and a second current command, and output the generated two-phase current command (Idq_ref) to the current controller.

In yet another exemplary embodiment, if it is recognized that the three-phase pole voltage command (Vabcn_ref) input from the space vector modulator is a voltage incapable of being linearly output, the first over-modulator may correct the three-phase pole voltage command (Vabcn_ref) as a linear output voltage capable of being linearly output by changing a command voltage vector of the three-phase pole voltage command (Vabcn_ref) input from the space vector modulator into a predetermined vector.

In still yet another exemplary embodiment, the high gain calculator may calculate a magnitude value (|Vdqref|) of the two-phase voltage command (Vdqref), calculate a difference value (VmagErr) between the magnitude value (|Vdqref|) of the two-phase voltage command and the input DC voltage (VdcLPF) of the inverter through $$V_{magErr} = |V_{dqref}| - \frac{VdcLPF}{\sqrt{3}},$$

and then calculate a voltage gain value by integrating the difference value (VmagErr).

In a further exemplary embodiment, if it is recognized that the output value of the multiplicator is a voltage incapable of being linearly output, the second over-modulator may correct the output value of the multiplicator as a final linear output voltage by changing the command voltage vector of the output value of the multiplicator into a predetermined vector.

In another aspect, the present invention provides a control method for improving a voltage utilization ratio of an inverter for a green car, the control method including: generating a two-phase current command (Idq_ref) having two phases of a first current command and a second current command; generating a two-phase voltage command (Vdqref) having two phases of a first voltage command and a second voltage command, using the two-phase current command (Idq_ref); generating a three-phase pole voltage command (Vabcn_ref), using the two-phase voltage command (Vdqref); modulating the three-phase pole voltage command (Vabcn_ref) into a linear output voltage capable of being linearly output; and calculating a voltage gain value, using the two-phase voltage command (Vdqref) and an input DC voltage (VdcLPF) of the inverter.

In an exemplary embodiment, the control method may include outputting a multiplication value by multiplying the linear output voltage by the voltage gain value; and receiving the multiplication value to modulate the received multiplication value into a final linear output voltage capable of being linearly output.

In another exemplary embodiment, the generating of the three-phase electrode voltage (Vabcn_ref) may include converting the two-phase voltage command (Vdqref) into a three-phase phase voltage command (Vabcs_ref); and converting the three-phase phase voltage command (Vabcs_ref) into the three-phase pole voltage command (Vabcn_ref).

In still another exemplary embodiment, in the modulating of the three-phase pole voltage command (Vabcn_ref) into the linear output voltage, if it is recognized that the three-phase pole voltage command (Vabcn_ref) is a voltage incapable of being linearly output, the three-phase pole voltage command (Vabcn_ref) may be corrected as a linear output voltage capable of being linearly output by changing a command voltage vector of the three-phase pole voltage command (Vabcn_ref) input from the space vector modulator into a predetermined vector.

In yet another exemplary embodiment, in the calculating of the voltage gain value, a magnitude value (|Vdqref|) of the two-phase voltage command (Vdqref) may be calculated, a difference value (VmagErr) between the magnitude value (|Vdqref|) of the two-phase voltage command and the input DC voltage (VdcLPF) of the inverter may be calculated through $$V_{magErr} = |V_{dqref}| - \frac{VdcLPF}{\sqrt{3}},$$

and a voltage gain value may be then calculated by integrating the difference value (VmagErr).

In still yet another exemplary embodiment, in the modulating of the multiplication value into the final linear output voltage, if it is recognized that the multiplication value is a voltage incapable of being linearly output, the multiplication value may be corrected as a final linear output voltage capable of being linearly output by changing the command voltage vector of the multiplication value into a predetermined vector.

A non-transitory computer readable medium containing program instructions executed by a controller is provided, where the computer readable medium includes: program instructions that generate a two-phase current command (Idq_ref) having two phases of a first current command and a second current command; program instructions that generate a two-phase voltage command (Vdqref) having two phases of a first voltage command and a second voltage command, using the two-phase current command (Idq_ref); program instructions that generate a three-phase pole voltage command (Vabcn_ref), using the two-phase voltage command (Vdqref); program instructions that modulate the three-phase pole voltage command (Vabcn_ref) into a linear output voltage capable of being linearly output; and; program instructions that calculate a voltage gain value, using the two-phase voltage command (Vdqref) and an input DC voltage (VdcLPF) of the inverter.

Other aspects and exemplary embodiments of the invention are discussed infra.

According to the present invention, the voltage utilization ratio of the inverter for motor control is improved, thereby improving the output and efficiency of a motor system. As a result, it is possible to improve the fuel efficiency of the green car.

Further, the present invention can be implemented without changing any design of hardware, and accordingly, there is no increase in unit cost.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
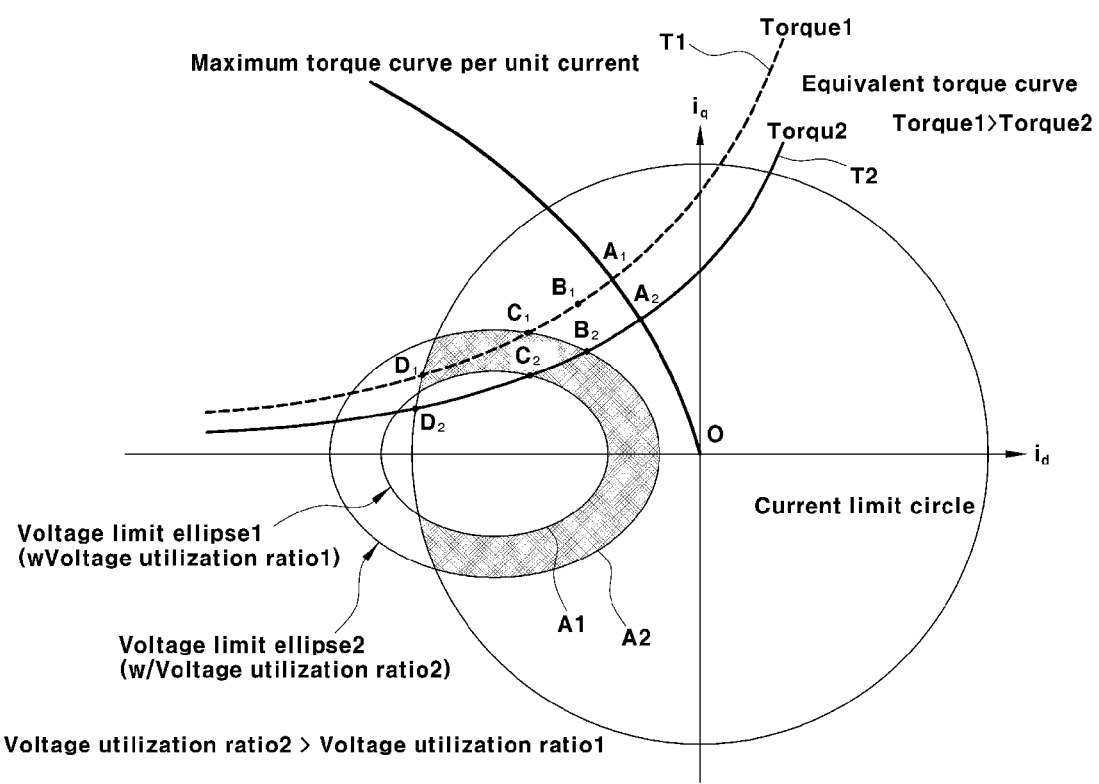
FIG. 1 is a conceptual view illustrating an effect that occurs when the voltage utilization ratio of an inverter for controlling a driving motor of a green car is improved.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar teen as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

As is known in the art, the voltage utilization ratio of an inverter is a ratio of an output AC voltage of the inverter (i.e., an input voltage of a motor tell final in a vehicle) with respect to an input DC voltage input to the inverter (i.e., an output voltage of a high voltage battery for driving a motor in the vehicle). The voltage utilization ratio of the inverter may be represented as shown in the following Equation 1.

$$\text{Voltage utilization ratio} = \frac{\text{maximum of output AC voltage of inverter}}{\text{output AC voltage of inverter}} \quad \text{Equation 1}$$

FIG. 1 is a conceptual view illustrating an effect that occurs when the voltage utilization ratio of an inverter for controlling a driving motor of a green car is improved.

As shown in FIG. 1, when the voltage utilization ratio of the inverter is improved (voltage utilization ratio 1→voltage utilization ratio 2) by moving from a first voltage limit ellipse A1 to a second voltage limit ellipse A2, the motor torque of the motor can be output as a torque value of a first torque curve T1 so that the output of a motor system is improved. When a motor torque is generated along a second torque curve T2 under the same output condition, the motor torque of the second torque curve T2 has an operating point moved from C2 to B2, so that the amplitude of input current decreases. Thus, the efficiency of the motor system is improved due to the decrease in current, so that the fuel efficiency of the vehicle is improved.

Figure 2:
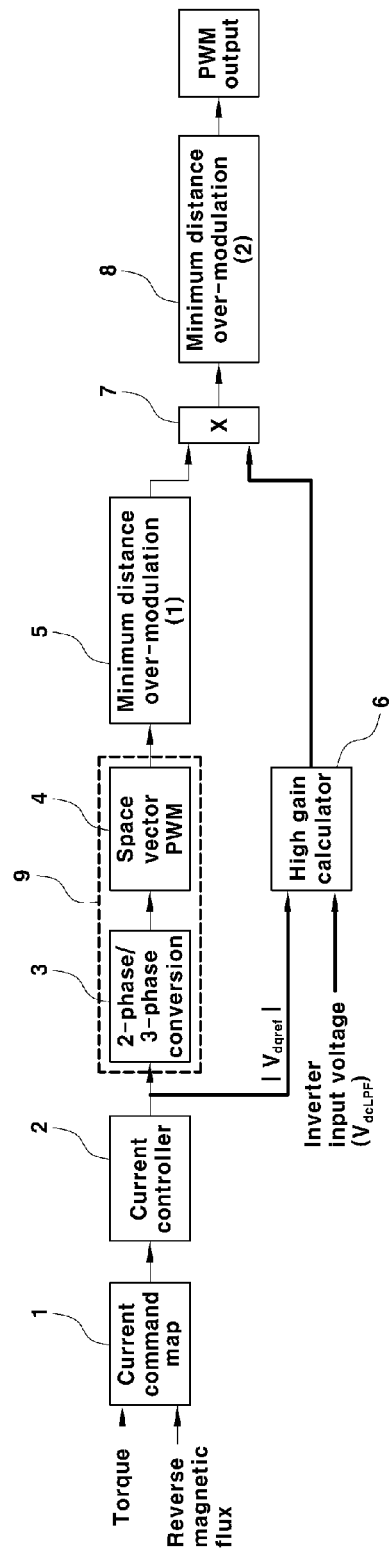
FIG. 2 is a block diagram illustrating a control device for improving a voltage utilization ratio of an inverter for a green car according to an embodiment of the present invention.

FIG. 2 is a block diagram illustrating a control device and a control method for improving a voltage utilization ratio of an inverter according to an embodiment of the present invention.

As shown in FIG. 2, in order to improve the voltage utilization ratio of the inverter, the control device according to the embodiment of the present invention may be configured with a current command map unit 1, a current controller 2, a command conversion unit 9 including a phase converter 3 and a space vector modulator 4, a first over-modulator 5, a high gain calculator 6, a multiplicator 7, and a second over-modulator 8.

The current command map unit 1 receives a torque command and a reverse magnetic flux value, input from the motor, to generate a two-phase current command (Idq_ref) having two phases of a first current command (D-axis current command) and a second current command (Q-axis current command). The current command map unit 1 outputs the generated two-phase current command (Idq_ref) to the current controller 2.

The current command map unit 1 is a storage unit in which a current command map is mapped and stored in advance. The current command map is set by matching the two-phase current command (Idq_ref) to the torque command and reverse magnetic flux value of the motor, and the two-phase current command (Idq_ref) simultaneously corresponding to the input torque command and reverse magnetic flux value is provided as an output value.

The current controller 2 receives the two-phase current command (Idq_ref) input from the current command map unit 1 to generates a two-phase voltage command (Vdqref) having two phases of a first voltage command (D-axis voltage command) and a second voltage command (Q-axis voltage command). The current controller 2 outputs the generated two-phase voltage command (Vdqref) to the phase converter 3.

The phase converter 3 receives the two-phase voltage command (Vdqref) input from the current controller 2 to convert the two-phase voltage command (Vdqref) into a three-phase phase voltage command (Vabcs_ref). The phase converter 3 outputs the generated three-phase phase voltage command (Vabcs_ref) to the space vector modulator 4.

The space vector modulator 4 is a modulator using a space vector pulse width modulator (PWM) technique. The space vector modulator 4 converts the three-phase phase voltage command (Vabcs_ref) input from the phase converter 3 into a three-phase pole voltage command (Vabcn_ref), and outputs the converted three-phase pole voltage command (Vabcn_ref) to the first over-modulator 5.

Here, the three-phase phase voltage command (Vabcs_ref) refers to a voltage command applied to a three-phase load, and the three-phase pole voltage command (Vabcn_ref) refers to a voltage command that determines the state of each phase switch.

In particular, the command conversion unit 9 including the phase converter 3 and the space vector modulator 4 receives the two-phase voltage command (Vdqref) input from the current controller 2 to generate and output the three-phase pole voltage command (Vabcn_ref).

The first over-modulator 5 changes (modulates) a voltage incapable of being linearly output into a voltage capable of being linearly output, using a minimum distance over-modulation technique. The first over-modulator 5 changes the three-phase pole voltage command (Vabcn_ref) input from the space vector modulator 4 into a voltage capable of being linearly output, and outputs the changed voltage to the multiplicator 7.

Here, the minimum distance over-modulation technique is a technique for newly setting a command voltage vector to reduce an error between the vector and magnitude of the three-phase voltage command is reduced. In particular, in order to reduce the error between the vector and magnitude of the three-phase voltage command, the three-phase pole voltage command is corrected by changing (modulating) a command voltage vector.

Therefore, if a voltage incapable of being linearly output is generated, i.e., if it is recognized that the three-phase pole voltage command (Vabcn_ref) input from the space vector modulator 4 is a voltage incapable of being linearly output, the first over-modulator 5 corrects the three-phase pole voltage command (Vabcn_ref) into a voltage (linear output voltage) capable of being linearly output by changing the command voltage vector of the three-phase pole voltage command (Vabcn_ref) input from the space vector modulator 4 into a predetermined vector.

The three-phase pole voltage command (Vabcn_ref) (linear output voltage) corrected as described above is output to the multiplicator 7.

The multiplicator 7 multiplies the linear output voltage output from the first over-modulator 5 by an output value of the high gain calculator 6.

Figure 3:
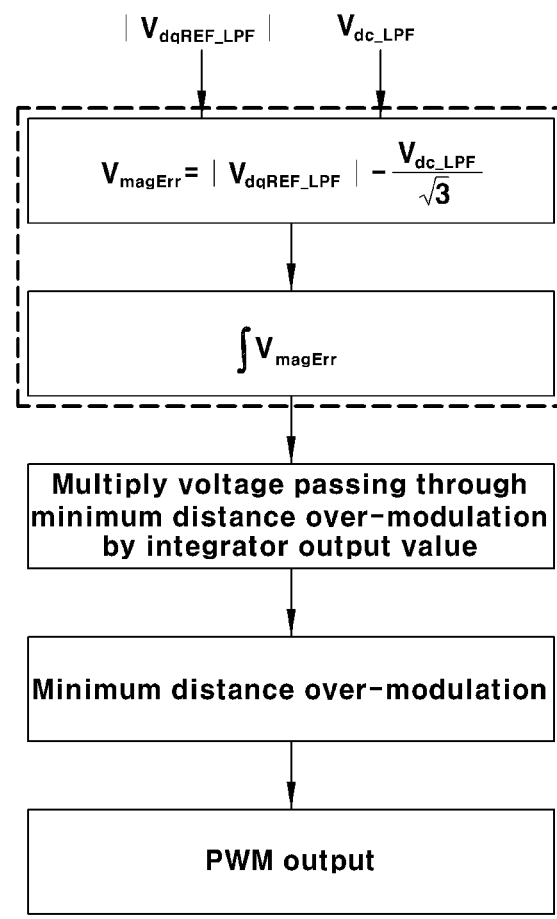
FIG. 3 is a flowchart partially illustrating a control process of improving the voltage utilization ratio of the inverter for the green car according to an embodiment of the present invention.

FIG. 3 is a flowchart partially illustrating a process of generating a PWM output using an output value of the high gain calculator according to an embodiment of the present invention. In FIG. 3, VdqREF_LPF is a value equal to Vdqref of the following Equation 2.

Referring to FIGS. 2 and 3, the high gain calculator 6 receives the two-phase voltage command (Vdqref) as an output value of the current controller 2 and an input DC voltage (VdcLPF) of the inverter (i.e., an output voltage of the high voltage battery) to perform a calculation as shown in the following Equation 2.

$$V_{magErr} = |V_{dqref}| - \frac{VdcLPF}{\sqrt{3}} \quad \text{Equation 2}$$

The high gain calculator 6 first calculates a magnitude value (|Vdqref|) of the two-phase voltage command (Vdqref) and then calculates a difference value (VmagErr) between the magnitude value (|Vdqref|) of the two-phase voltage command and the input DC voltage (VdcLPF) of the inverter as shown in Equation 2. Next, the high gain calculator 6 calculates a voltage gain value (integrator output value) by integrating the difference value (VmagErr) through an integrator in the high gain calculator 6. The integrator output value becomes a final output value of the high gain calculator 6.

The multiplicator 7 multiplying the final output value (voltage gain value) of the high gain calculator 6 and the output value of the first over-modulator 5 outputs the multiplied value to the second over-modulator 8.

When the output of the multiplicator 7 is generated as a voltage incapable of being linearly output, the second over-modulator 8 is configured, to change the output of the multiplicator 7 into a voltage capable of being linearly output.

Like the first over-modulator 5, the second over-modulator 8 changes a voltage incapable of being linearly output into a voltage capable of being linearly output, using the minimum distance over-modulation technique. The second over-modulator 8 changes and outputs an output value of the multiplicator 7 into a voltage capable of being linearly output.

Specifically, if it is recognized that the output value of the multiplicator 7 is a voltage incapable of being linearly output, the second over-modulator 8 changes and corrects the output value of the multiplicator 7 into a voltage (final linear output voltage) capable of being linearly output by changing the command voltage vector of the output voltage of the multiplicator 7 into a predetermined vector.

The output value (final linear output voltage) corrected as described above is output from the second over-modulator 8. In this state, the final linear output voltage is output in a PWM form.

In particular, the second over-modulator 8 outputs a PWM signal as the final output of the control device according to the present invention.

As described above, in the present invention, the voltage utilization ratio of the inverter is improved by modulating, e.g., by a maximum amount an input DC voltage of the inverter into an output AC voltage of the inverter. Thus, the output of the motor system can be improved under the same current condition. As the input current decreases under the same output, the efficiency of the motor system can be improved, thereby increasing vehicle fuel efficiency.

In the present invention, a high voltage for over-modulation is formed just before an over-modulation calculation is performed, thereby maintaining motor control stability. Further, it is possible to improve the voltage utilization ratio of the inverter while maintaining motor control stability.

In the present invention, the voltage utilization ratio of the inverter is improved while performing current control, so as to avoid any problems in the current control of the driving motor for the green car.

Figure 4:
FIG. 4 is a graph illustrating a simulation result (left drawing) when an inverter voltage is controlled without using any high gain calculator according to a conventional art and a simulation result (right drawing) when an inverter voltage is controlled using a high gain calculator according to the present invention.

Meanwhile, FIG. 4 is a graph illustrating a simulation result (left drawing) when an inverter voltage is controlled without using any high gain calculator according to a conventional art and a simulation result (right drawing) when an inverter voltage is controlled using a high gain calculator according to the present invention. Here, it is decided that as the diagonal length of the graph increases, the voltage utilization ratio increases.

As shown in FIG. 4, it can be seen that when the voltage utilization ratio of the inverter is controlled using the high gain calculator according to the present invention, the voltage utilization ratio of the inverter according to the present invention is increased as compared with that of the conventional inverter.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A control device for improving a voltage utilization ratio of an inverter for a green car, the control device comprising:

a current command map unit configured to receive a torque command and a reverse magnetic flux value, input from a motor, to generate a two-phase current command (Idq_ref) having two phases of a first current command (D-axis current command) and a second current command (Q-axis current command);

a current controller configured to receive the two-phase current command (Idq_ref) and generate a two-phase voltage command (Vdqref) having two phases of a first voltage command and a second voltage command;

a command conversion unit configured to receive the two-phase voltage command (Vdqref) input from the current controller to generate a three-phase pole voltage command (Vabcn_ref);

a first over-modulator configured to modulate the three-phase pole voltage command (Vabcn_ref) input from the command conversion unit into a voltage capable of being linearly output;

a high gain calculator configured to receive the two-phase voltage command (Vdqref) of the current controller and an input DC voltage (VdcLPF) of the inverter to calculate a voltage gain value;

a multiplicator configured to multiply an output value of the first over-modulator by an output of the high gain calculator; and a second over-modulator configured to receive an output value of the multiplicator to modulate the received output value into a voltage capable of being linearly output.

2. The control device of claim 1, wherein, the output value of the multiplicator is a voltage incapable of being linearly output, the second over-modulator corrects the output value of the multiplicator as a final linear output voltage by changing the command voltage vector of the output value of the multiplicator into a predetermined vector.

3. The control device of claim 1, wherein the command conversion unit includes:

a phase converter configured to receive the two-phase voltage command (Vdqref) input from the current controller to convert the received two-phase voltage command (Vdqref) into a three-phase phase voltage command (Vabcs_ref); and a space vector modulator configured to convert the three-phase phase voltage command (Vabcs_ref) input from the phase converter into a three-phase pole voltage command (Vabcn_ref).

4. The control device of claim 3, wherein, if the three-phase pole voltage command (Vabcn_ref) input from the space vector modulator is a voltage incapable of being linearly output, the first over-modulator corrects the three-phase pole voltage command (Vabcn_ref) as a linear output voltage capable of being linearly output by changing a command voltage vector of the three-phase pole voltage command (Vabcn_ref) input from the space vector modulator into a predetermined vector.

5. The control device of claim 1, wherein the high gain calculator calculates a magnitude value (|Vdqref|) of the two-phase voltage command (Vdqref), calculates a difference value (VmagErr) between the magnitude value (|Vdqref|) of the two-phase voltage command and the input DC voltage (VdcLPF) of the inverter through $$V_{magErr} = |V_{dqref}| - \frac{VdcLPF}{\sqrt{3}},$$

and then calculates a voltage gain value by integrating the difference value (VmagErr).

6. A control method for improving a voltage utilization ratio of an inverter for a green car, the control method comprising:

receiving, by a current command map unit, a torque command and a reverse magnetic flux value, input from a motor, to generate a two-phase current command (Idq_ref) having two phases of a first current command and a second current command;

receiving, by a current controller, the two-phase current command (Idq_ref) to generate a two-phase voltage command (Vdqref) having two phases of a first voltage command and a second voltage command, using the two-phase current command (Idq_ref);

generating, by a command conversion unit, a three-phase pole voltage command (Vabcn_ref), using the two-phase voltage command (Vdqref);

modulating, by a first over-modulator, the three-phase pole voltage command (Vabcn_ref) into a linear output voltage capable of being linearly output;

calculating, by a high gain calculator, a voltage gain value, using the two-phase voltage command (Vdqref) and an input DC voltage (VdcLPF) of the inverter;

outputting, by a multiplicator, a multiplication value by multiplying the linear output voltage by the voltage gain value; and receiving, by a second over-modulator, the multiplication value to modulate the received multiplication value into a final linear output voltage capable of being linearly output.

7. The control method of claim 6, wherein, in the modulating of the multiplication value into the final linear output voltage, if it is recognized that the multiplication value is a voltage incapable of being linearly output, the multiplication value is corrected as a final linear output voltage capable of being linearly output by changing the command voltage vector of the multiplication value into a predetermined vector.

8. The control method of claim 6, wherein the generating of the three-phase electrode voltage (Vabcn_ref) includes:

converting, by a phase converter, the two-phase voltage command (Vdqref) into a three-phase voltage command (Vabcs_ref); and converting, by a space vector modulator, the three-phase phase voltage command (Vabcs_ref) into the three-phase pole voltage command (Vabcn_ref).

9. The control method of claim 6, wherein, in the modulating of the three-phase pole voltage command (Vabcn_ref) into the linear output voltage, if it is recognized that the three-phase pole voltage command (Vabcn_ref) is a voltage incapable of being linearly output, the three-phase pole voltage command (Vabcn_ref) is corrected as a linear output voltage capable of being linearly output by changing a command voltage vector of the three-phase pole voltage command (Vabcn_ref) input from a space vector modulator into a predetermined vector.

10. The control method of claim 6, wherein, in the calculating of the voltage gain value, a magnitude value (|Vdqref|) of the two-phase voltage command (Vdqref) is calculated, a difference value (VmagErr) between the magnitude value (|Vdqref|) of the two-phase voltage command and the input DC voltage (VdcLPF) of the inverter is calculated through $$V_{magErr} = |V_{dqref}| - \frac{VdcLPF}{\sqrt{3}},$$

and a voltage gain value is then calculated by integrating the difference value (VmagErr).

* * * * *